Patented Apr. 11, 1939

2,154,248

UNITED STATES PATENT OFFICE 2,154,248

PARAMINOARYLSULPHONAMIDOARYL ORTHOSULPHONIC ACIDS AND THEIR SALTS

Elmore H. Northey, Bound Brook, N. J., assignor to The Calco Chemical Company, Inc., Bound Brook, N. J., a corporation of Delaware No Drawing. Application October 27, 1938, Serial No. 237,190

4 Claims. (Cl. 260—510)

This invention relates to paraminoarylsulphonamidoaryl orthosulphonic acids and their salts, and to methods of making them.

The compounds of the present invention may be expressed by the following general formula:

$$R\text{—}SO_2NH\text{—}R'$$

in which R is a p-aminobenzene radical and R' is a benzene orthosulphonic acid or a salt of a benzene orthosulphonic acid.

In the past, some of the sulphanilic acid derivatives have been proposed for the treatment of various bacterial infections such as streptococcus, pneumococcus, and the like, but they have proven relatively ineffective, being less effective than sulphanilamide itself. The compounds of the present invention, however, show increased effectiveness over sulphanilamide and the meta and para sulphonic acid derivatives, the following comparative tests showing the improved results of the present invention:

Three strains of organisms were employed: strain C-204, a highly virulent strain of beta hemolytic streptococci obtained from Johns Hopkins University; strain SH 1685, an equally virulent strain obtained from the National Institute of Health, Washington, D. C.; and Todd strain of beta hemolytic streptococci, a slightly less virulent strain. The mice were divided into groups of ten and all were infected with $0.1 \times 10^{-6}$ cc. of a sixteen-hour culture of the infecting organism, administered intraperitoneally.

The first group of ten animals was set aside to act as untreated controls and if any survived twenty-four hours after injection, the entire experimental series was thrown out.

The second group of ten animals was treated with 0.75 gm. of sulphanilamide, administered subcutaneously, to act as sulphanilamide controls.

Subsequent groups of animals received equivalent doses of compounds under study and all animals were kept under observation for a period of 96 hours. The results are shown in the following tables:

| Drug | Infecting organism | Trial No. | Percentage survival |
|---|---|---|---|
| Sulphanilylsulphanilic acid (Na salt) | C-204 | 1 | 0 |
|  | C-204 | 2 | 0 |
|  | C-204 | 3 | 0 |
|  | SH 1685 | 4 | 0 |
|  | SH 1685 | 5 | 0 |
| Sulphanilylmetanilic acid | C-204 | 1 | 50 |
|  | C-204 | 2 | 40 |
|  | SH 1685 | 3 | 60 |
|  | Todd | 4 | 60 |
| Sulphanilylorthanilic acid | C-204 | 1 | 80 |
|  | C-204 | 2 | 90 |
|  | C-204 | 3 | 100 |
|  | C-204 | 4 | 80 |
|  | SH 1685 | 5 | 80 |
|  | SH 1685 | 6 | 80 |
|  | Todd | 7 | 60 |
|  | Todd | 8 | 70 |

PERCENTAGE MORTALITY

| Group No. | 12 hrs. | 18 hrs. | 24 hrs. | 36 hrs. | 48 hrs. | 60 hrs. | 72 hrs. | 84 hrs. | 96 hrs. |
|---|---|---|---|---|---|---|---|---|---|
| 1 | 0 | 60 | 100 |  |  |  |  |  |  |
| 2 | 0 | 0 | 0 | 0 | 10 | 10 | 20 | 20 | 20 |
| 3 | 0 | 0 | 10 | 10 | 70 | 80 | 100 |  |  |
| 4 | 0 | 0 | 0 | 10 | 20 | 40 | 40 | 50 | 50 |
| 5 | 0 | 0 | 0 | 0 | 10 | 10 | 10 | 10 | 10 |

Group 1.—Untreated controls.
Group 2.—Sulphanilamide (0.75 gm. subcutaneously).
Group 3.—Sulphanilylsulphanilic acid (Na salt—0.75 gm. subcutaneously).
Group 4.—Sulphanilylmetanilic acid (0.75 gm. subcutaneously).
Group 5.—Sulphanilylorthanilic acid (0.75 gm. subcutaneously).
($0.1 \times 10^{-6}$ cc. of sixteen-hour cultures of C-204).

It can be seen from the above results that the orthanilic acid derivative is somewhat more effective as a therapeutic agent than any of the other agents tested, including sulphanilamide itself. This result is surprising and unexpected since it is contrary to the conclusions which have been reached in the prior art by testing the therapeutic effectiveness of the simple sulphonamides. In the case of these relatively simple compounds, the ortho sulphonamides are not nearly as effective therapeutically as the corresponding meta and para derivatives.

I have not as yet determined a reason for this unexpected behaviour of the ortho sulphonic acid derivatives, and the present invention is therefore not limited to any particular theory of action.

In general, the simple sulphanilyl derivatives, that is to say, those in which R is unsubstituted p-aminobenzene, show an excellent therapeutic action and are cheaper than those which have other substituents in the ring, such as halogen or alkyl, or substituents in the amino ring. In the case of substituents in the amino group, particularly where the substituent is itself an aminosulpho radical, desirable therapeutic action is obtained.

The compounds of the present invention are usually used therapeutically in the form of their salts, and it does not make any material difference which base is used to produce the salt, provided the base itself is not toxic. The corresponding common salts, such as sodium, potassium, ammonium, amine salts and the like, may be used and are included in the present invention. These salts are usually preferable because of their cheapness and ease of preparation, but other salts such as salts of the heavy metals, for example copper, silver, zinc and the like, can be prepared and are also included in the scope of the invention.

The products of the present invention can also be used as intermediates for azo dyes, the color, of course, varying with the particular ortho compound used.

The invention will be described in greater detail in conjunction with the following examples which illustrate the preparation of a few typical acids and salts falling thereunder, but it should be understood that the invention is not limited to the details therein set forth. The parts are by weight.

Example 1

*N-sulphanilylorthanilic acid*

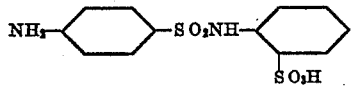

1730 parts of orthanilic acid are dissolved in 8000 parts of water with 400 parts of caustic soda and 200 parts of soda ash. To this is gradually added, with agitation, a wet paste containing 2330 parts of real acetylsulphanilyl chloride. The solution is maintained at a pH of 8–10 by the addition of 50% caustic soda as necessary, and is held at 40°–50° C. by means of ice. Agitation is continued for a half hour after all of the acetylsulphanilyl chloride has dissolved.

The course of the reaction can be determined by nitrite titration of uncombined orthanilic acid in a small sample and the reaction is continued with further additions of acetylsulphanilyl chloride until no further decrease in the nitrite value is observed. The solution is then acidified to a pH of approximately 1, and the precipitated acetylsulphanilylorthanilic acid is filtered off.

The product is hydrolyzed by dissolving the filter cake in 3000 parts of boiling water, adding 1800 parts of 36% hydrochloric acid and boiling for 2 hours with agitation. The hot slurry of N-sulphanilylorthanilic acid is filtered and purified by recrystallization from hot water in which it is soluble.

An alkaline hydrolysis procedure may also be employed as follows: 1000 parts of flake caustic soda are added to the solution of acetylsulphanilylorthanilic acid in 3000 parts of water, and the reaction mixture is boiled from 2 to 3 hours until there is not any further increase in the nitrite value. The solution is then acidified with concentrated hydrochloric acid to a pH of 1 or below, filtered, and purified by recrystallization from hot water.

Further purification of the crude product obtained by either the acid or alkali hydrolysis may be effected by dissolving in water with caustic soda to a pH of 4–6, decolorizing with activated carbon, reprecipitating with hydrochloric acid, filtering and crystallizing from hot water.

Example 2

*Sodium N-sulphanilylorthanilate*

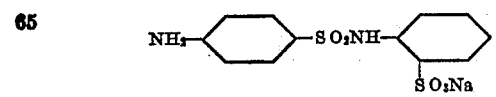

The sodium salt of N-sulphanilylorthanilic acid may be prepared by dissolving the purified acid in an equal weight of water and adding caustic soda to a pH of approximately 6. Alcohol is then added to the hot solution to produce about a 50% concentration, it is cooled to a low temperature, and the sodium salt crystallizes out. Sodium N-sulphanilylorthanilate is extremely soluble in both water and alcohol.

Example 3

*Strepto N-disulphanilylorthanilic acid*

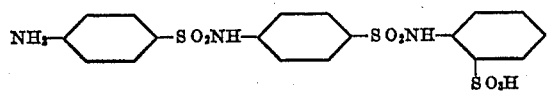

328 parts of N-sulphanilylorthanilic acid are dissolved in 1500 parts of water with 40 parts of caustic soda and 50 parts of soda ash. A wet paste containing 233 parts of real acetylsulphanilyl chloride is added while the temperature is held at 40°–50° C. by means of ice, and the pH is maintained at 8–10 by the addition of 50% caustic soda solution as needed. Stirring is continued for about a half hour after all the acetylsulphanilyl chloride is dissolved, and the reaction tested for completion as described in Example 1. The warm reaction mixture is then neutralized with hydrochloric acid and the product comes down as a tarry mass which crystallizes on cooling.

Hydrolysis is effected by dissolving the product thus obtained in 500 parts of hot water and boiling with 250 cc. of concentrated hydrochloric acid for an hour with agitation, filtering hot, and crystallizing from hot water.

Example 4

*Sodium strepto N-disulphanilylorthanilate*

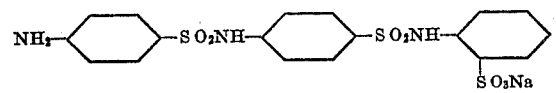

The sodium salt of strepto N-disulphanilylorthanilic acid is produced by dissolving the precipitate obtained in Example 3 in 450 parts of hot water with sufficient caustic soda to give a pH of 4–6. The solution is treated with decolorizing carbon and cooled, and sodium strepto N-disulphanilylorthanilate crystallizes out.

Example 5

*Strepto N-trisulphanilylorthanilic acid*

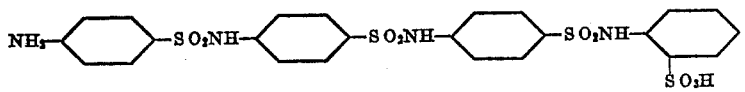

505 parts of strepto N-disulphanilylorthanilic acid prepared as in Example 4 are dissolved in 2000 parts of water at 40° C. with 40 parts of caustic soda and 50 parts of soda ash. A paste containing 311 parts of real acetylsulphanilyl chloride is then gradually added with agitation, the pH being maintained at 8–10 by the addition of 50% caustic soda solution. Stirring is continued about an hour after all of the acetylsulphanilyl chloride has been added, and the warm solution is then clarified and acidified with concentrated hydrochloric acid to a pH of 1 or below. A tarry mass precipitates which is removed and added to 600 parts of boiling water. 400 cc. of concentrated hydrochloric acid is added and the mixture then boiled with agitation for 1 hour and cooled. The tar separating out is placed in 4000 parts of boiling water and stirred until crystallization is complete, at which time the mixture is cooled and filtered. The crude strepto N-trisulphanilylorthanilic acid is purified by several recrystallizations from water.

Example 6

1-methyl-N-sulphanilylorthanilic acid

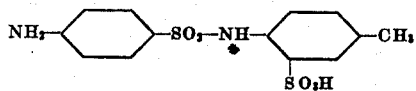

This compound is prepared by following the procedure of Example 1, starting with 1870 parts of 4-aminotoluene-5-sulphonic acid, and preferably using the alternate alkaline hydrolysis.

If desired, the same procedure can be used, starting with a corresponding amount of 4-aminochlorbenzene-5-sulphonic acid, to prepare 1-chloro-N-sulphanilylorthanilic acid.

In the examples, the acyl derivative of the p-aminosulphonic acid compounds used is the acetyl derivative. The invention is, however, in no sense limited to the use of this particular acyl group as the reaction itself does not depend on its identity and other acyl groups such as formyl, propionyl, butyryl, and the like, can be used. However, in practice, the acetyl group is the cheapest one and will normally be employed.

This application is a continuation-in-part of my application, Serial No. 172,695 filed November 4, 1937.

What I claim is:

1. N-sulphanilamidoaryl orthosulphonic acid compounds having the following formula

in which R is a p-aminobenzene radical and R' is a member of the group consisting of mononuclear aryl orthosulphonic acids and their salts.

2. N-sulphanilylorthanilic acid compounds having the following formula

in which R is a p-aminobenzene radical and R' is a member of the group consisting of orthanilic acid and its salts.

3. N-sulphanilylorthanilic acid compounds having the formula

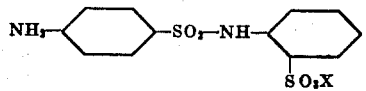

in which X is a member of the group consisting of hydrogen and a base.

4. Strepto N-polysulphanilylorthanilic acid compounds having the following formula

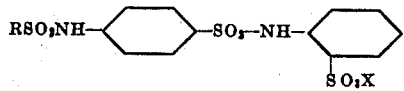

in which R is a p-aminobenzene radical and X is a member included in the group consisting of hydrogen and a base.

ELMORE H. NORTHEY.